US006991286B2

(12) United States Patent
Nelson et al.

(10) Patent No.: US 6,991,286 B2
(45) Date of Patent: Jan. 31, 2006

(54) RETRACTOR LOCATION FOR SEAT WITH INTEGRATED RESTRAINTS FOR A MOBILE VEHICLE

(75) Inventors: Erik K. Nelson, Woodburn, IN (US); Thomas R. Graham, Fort Wayne, IN (US); Patrick J. Mattes, Yoder, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/053,153

(22) Filed: Feb. 8, 2005

(65) Prior Publication Data

US 2005/0189799 A1 Sep. 1, 2005

Related U.S. Application Data

(60) Provisional application No. 60/548,030, filed on Feb. 26, 2004, provisional application No. 60/548,080, filed on Feb. 26, 2004.

(51) Int. Cl.
*B60N 2/42* (2006.01)

(52) U.S. Cl. ............................ 297/216.1; 297/216.13; 297/216.14; 297/483; 297/488; 280/751

(58) Field of Classification Search ............. 297/216.1, 297/216.13, 216.14, 483, 488; 280/751
See application file for complete search history.

(56) References Cited

U.S. PATENT DOCUMENTS

| | | | | |
|---|---|---|---|---|
| 4,335,918 A | * | 6/1982 | Cunningham | 297/216.14 |
| 4,784,352 A | | 11/1988 | Smith et al. | |
| 4,930,808 A | * | 6/1990 | Mikoll et al. | 280/751 |
| 5,882,072 A | * | 3/1999 | Morlock | 297/216.13 |
| 6,033,017 A | * | 3/2000 | Elqadah et al. | 297/216.1 |
| 6,123,388 A | | 9/2000 | Vits et al. | |
| 6,485,098 B1 | | 11/2002 | Vits et al. | |

* cited by examiner

*Primary Examiner*—Anthony D. Barfield
(74) *Attorney, Agent, or Firm*—Jeffrey P. Calfa; Dennis Kelly Sullivan; Susan L. Lukasik

(57) ABSTRACT

The invention involves shifting the location of the seat belt retractor in order to reduce the thickness of the seat especially in the lower regions for a mobile vehicle seat. The seat may be used for a mobile vehicle as a school bus as well as for automotive applications. The seat belt retractors are attached to a portion of the seat structure that allows the webbing to exit the retractor on the front surface of the seat back. The webbing is then allowed to cross over to the rear surface of the seat back as it rises to the turning-loop. The retractor may be located forward of the seat back pivot point on the seat frame in order to allow for the webbing to exit on the front surface of the seat back.

8 Claims, 3 Drawing Sheets

RETRACTOR LOCATION FOR SEAT WITH INTEGRATED RESTRAINTS FOR A MOBILE VEHICLE

This patent issued from a non-provisional patent application claiming the priority of provisional patent applications Ser. Nos. 60/548,030, filed Feb. 26, 2004, and 60/548,080, filed Feb. 26, 2004.

BACKGROUND

Automotive vehicles have had three point seat belt systems that combine a lap belt and an upper torso belt for some time now. The tongue may be swung across the person and engaged with a buckle affixed to the seat thereby positioning one portion of the belt across the lap and another portion of the belt across the upper torso.

Designers of school buses face a conundrum in including three point seat belts in buses in that the requirements involved with installing a three-point seat belt may act in conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three point seat belt designs are also regulated under NHTSA code. These requirements relate to belts that are mounted in such a fashion that they inhibit a belted passengers forward movement. This three-point belt-mounting requirement is codified in 49 C.F.R. Sections 571.209 and 571.210 (FMVSS 209 and FMVSS 210).

The design conundrum results from the fact that tests have shown that in a rapid deceleration where the passenger in the front seat is buckled and the passenger in the rear seat is not, the initial action is that the buckled passenger moves forward applying tension on the buckled seat belt and the component the belt is affixed to. This results in a pulling of the fixture component in a forward direction thereby reducing the strength on the rear impact face for the unbuckled passenger behind the seat in question. Following the tension applied on the three-point belt, the rear passenger would be expected to contact the seat back. The reduction in seat back strength due to the pull on the three-point seat belt for FMVSS 210 requirement may reduce the ability of the seat back to meet the FMVSS 222 requirements. Recent school bus seat designs have been developed that involve a movable inner seat for the mounting of the three point seat belts and an immovable seat back portion for the absorption of the rear unbuckled passenger loads. The movable inner seat was inserted into a recess within the immovable seat back. The immovable seat back would be designed to deform in order to comply with FMVSS 222. One of these designs was disclosed in U.S. Pat. Nos. 6,123,388, and 6,485,098. The concept of a seat inserted within a seat was not new to this bus seat. That concept was disclosed in U.S. Pat. No. 4,784,352. One problem with this prior art was the complexity of the mechanism to stop the movable inner seat.

SUMMARY

The invention involves shifting the location of the seat belt retractor in order to reduce the thickness of the seat especially in the lower regions for a mobile vehicle seat. The seat may be used for a mobile vehicle as a school bus as well as for automotive applications. The seat belt retractors are attached to a portion of the seat structure that allows the webbing to exit the retractor on the front surface of the seat back. The webbing is then allowed to cross over to the rear surface of the seat back as it rises to the turning-loop. The retractor may be located forward of the seat back pivot point on the seat frame in order to allow for the webbing to exit on the front surface of the seat back.

DRAWINGS

Other objects and advantages of the invention will become more apparent upon perusal of the detailed description thereof and upon inspection of the drawings, in which.

DESCRIPTION OF INVENTION

Figure 1:
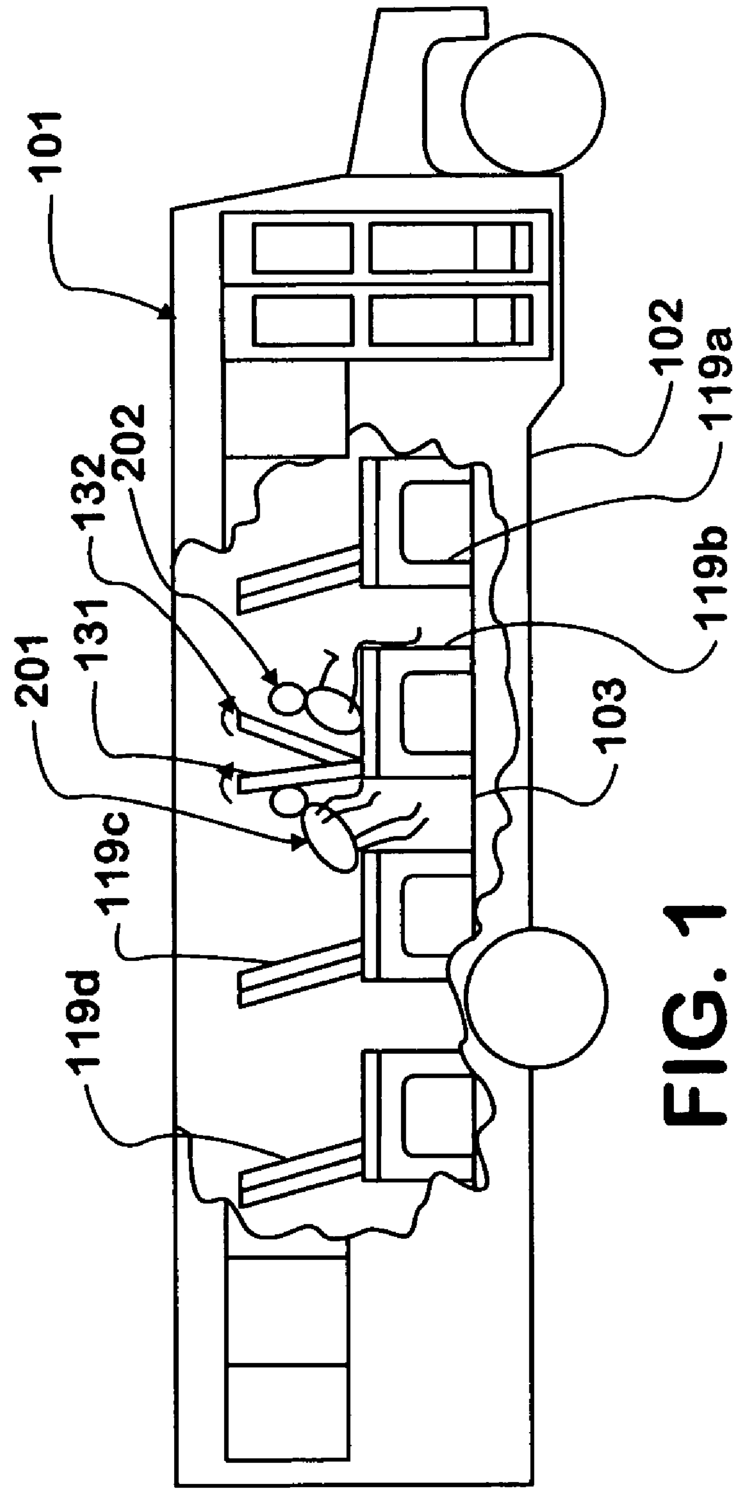
FIG. 1 is a cutaway view of a vehicle using an embodiment of the seat sub-system made in accordance with this invention.
Figure 2:
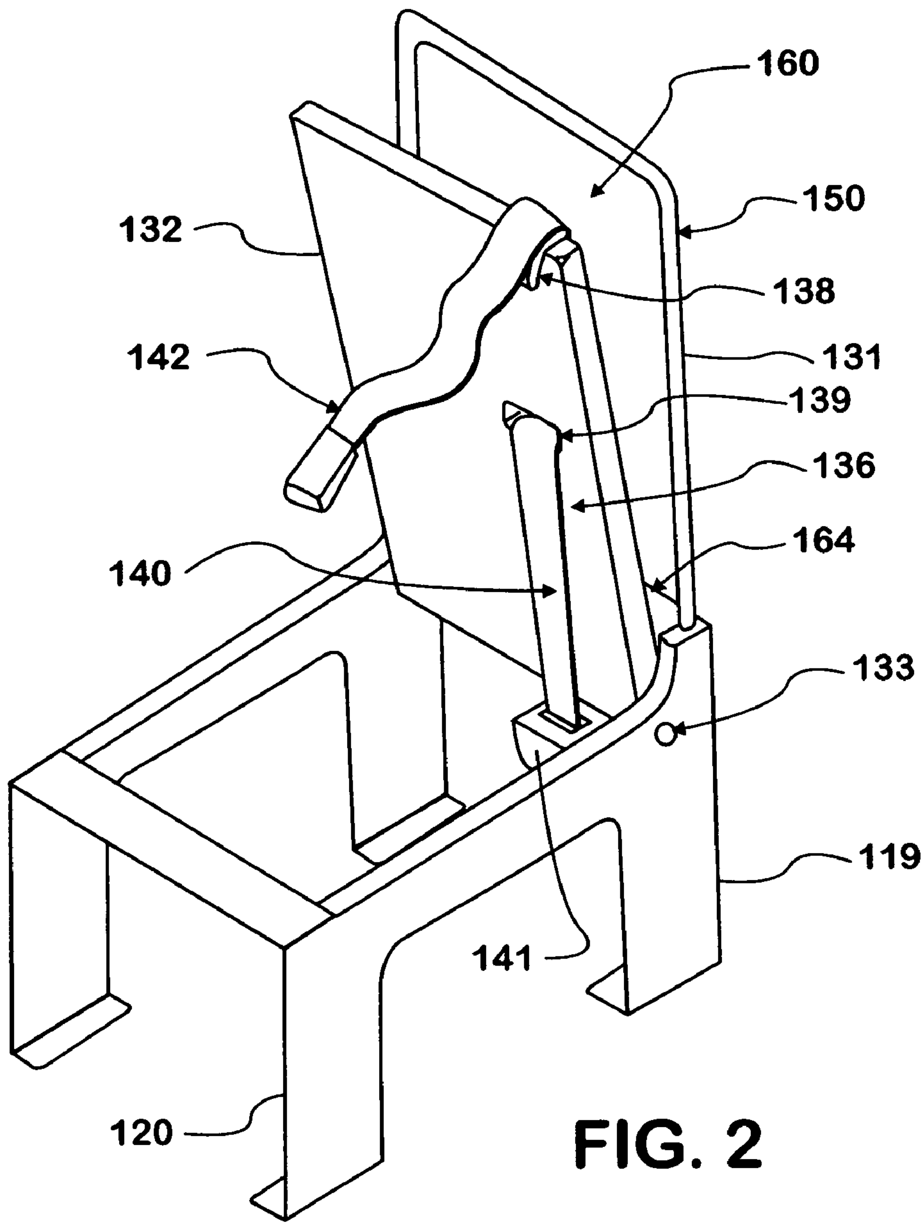
FIG. 2 is a perspective view of the seat sub-system without showing foam padding for use with the vehicle shown in FIG. 1.

A motor vehicle 101 includes a passenger carrying body 102. The vehicle 101 may be a school bus. The body 102 includes a mounting floor 103 for the mounting and placement of passenger seating. The vehicle 101 shown in FIG. 1 has a series of passenger seats 119*a*, 119*b*, 119*c*, and 119*d* installed on the mounting floor 103 of the vehicle body 102 arranged from the front of the vehicle to the back. A rearward passenger 201 may sit in seat 119*c* and a frontward passenger 202 may sit in seat 119*b* in front of rearward passenger 201. One passenger seat with integrated passenger restraints 119 made in accordance with the invention has a movable front frame 132 that a seat occupant rests his or her back against normally. The front frame 132 is mounted to a seat frame 120 as shown in FIG. 2. The front frame 132 is the mounting point for the upper portion of a three-point seat belt 142. The seat frame 120 is mountable to the bus body 102 mounting surface 103. The seat frame 120 contains a rear frame 131 to protect a passenger of rearward seat from moving out of his safety zone in a forward direction in the event of a rapid deceleration. This is shown in FIG. 1 that shows a rapid deceleration condition. The passenger 202 in seat 119*b* is buckled to the seat. The passenger 201 in the rearward seat 119*c* is not buckled. The passenger 201 is contained within the area between the rear frame of seat 119*b* and the front of seat 119*c*.

The vehicle may have a two-piece seat capable of complying with the federal requirements with reduced complexity. The front frame 132 is movable relative to the seat frame 120. In the embodiment shown in FIG. 3, the front frame 132 is rotatable about the seat frame 120 about a shaft or pivoting mechanism 133 that is at least partially engaged to the seat frame 120. The movable frame 132 is not shown in FIG. 2. The movable front frame 132 normally roughly parallel and in contact with the immovable rear frame 131. The movable front frame 132 may move forward due to the pull of a passenger held in a seat with belt 142. The force of the passenger on the belt 142 may pull the movable seat back 132 forward. The movement of the movable or front seat back 132 away from the rear frame 131 leaves the rear frame 131 intact to absorb the force from an unbelted passenger in the seat behind seat 119*b*.

The rear frame 131 is comprised of three main components: a rear or back frame seat structure 150; an energy absorbing back pan 160; and variable thickness foam 170. The rear frame seat structure 150 may be one integral piece of tubing bent or formed. The back pan 160 may be steel, however, in any case it will be of a flexible material allowing for energy absorption. The back pan 160 is engaged to the rear frame structure 150 on three of its four edges. There is a back pan lower edge 164 that is free moving or unengaged to the rear frame structure 150. The fact that the back pan 160 is only rigidly mounted on 3 edges allows for the lower edge 164 of the back pan 160 to flex in the fore-aft direction. The lower edge 164 of the back pan 160 may be unformed or not folded over or hemmed to allow for enhanced energy absorbing flexibility in the event of impact upon the rearward side of the rear frame 131 by an unbuckled passenger sitting in a seat behind seat 119. See FIG. 2.

Figure 3:
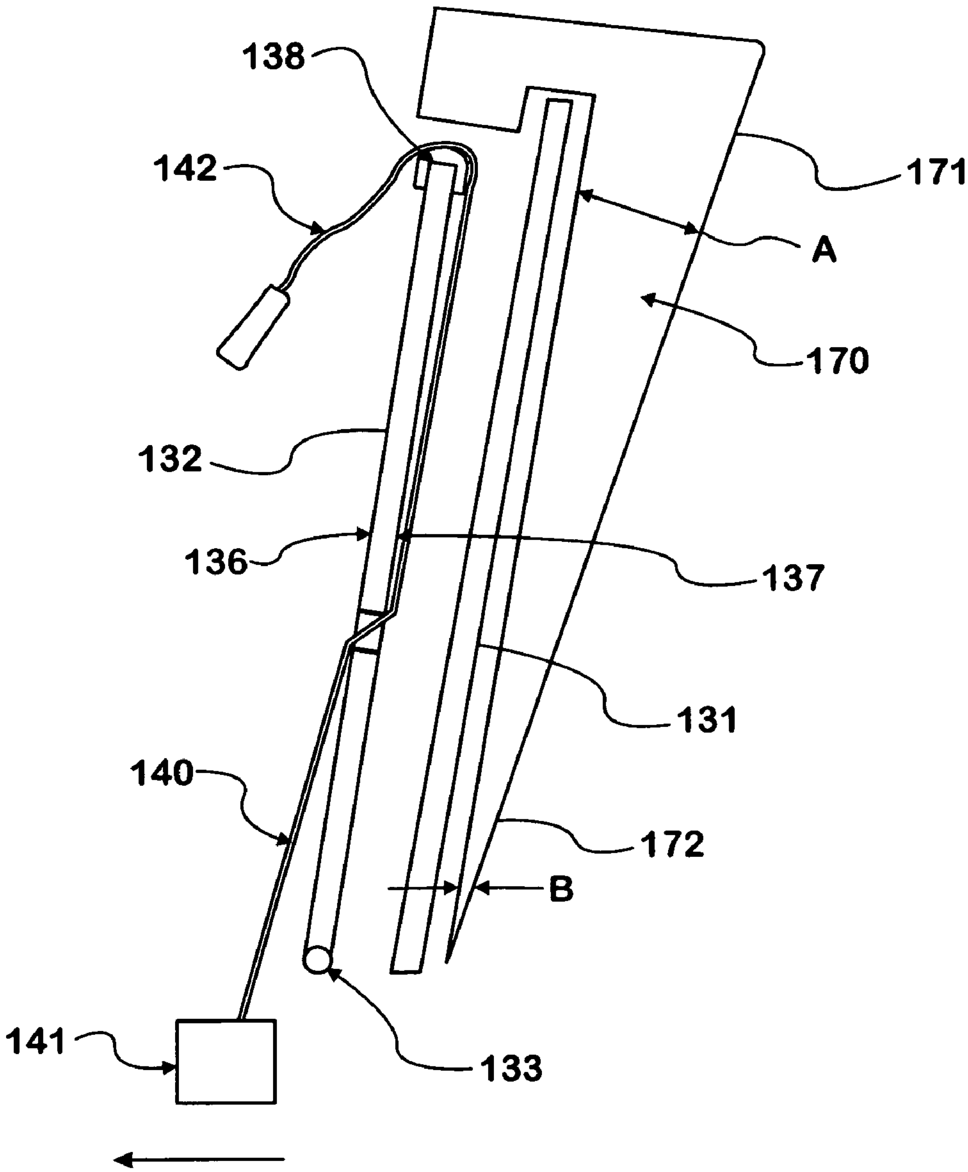
FIG. 3 is a side view of the seat sub-system of FIG. 2 showing foam padding.

The back pan 160 may be covered by foam 170 as shown in FIG. 3. The foam 170 includes a rear upper foam zone 171 and a rear lower or knee impact zone 172. The knee impact zone 172 has a foam thickness B while the upper foam zone has a foam thickness A. Foam thickness A is greater than foam thickness B due to the lower back pan 160 flexibility. In one embodiment, the ratio of foam thickness A to B is three to one (3:1). The foam thickness B of the knee impact zone 172 may be as thin as one half inch (0.5").

The three to one ratio of the lower to upper portion for the foam is important in achieving seat thinness. When seat spacing is measured at the h-point or cushion level, the knee protection zone is thinner than conventional seats and allows for a greater number of seats to be placed into a school bus. Utilizing a flexible steel back pan 160 combined with foam 170 in the proper ratios to absorb energy in the knee protection zone through the upper portion achieves the invention.

The invention involves shifting the location of a seat belt retractor 141 engaged to the seat frame 120 in order to reduce the thickness of the seat especially in the lower regions for a mobile vehicle seat. The seat 119 may be used for a mobile vehicle as a school bus as well as for automotive applications. The seat belt retractors 141 are attached to a portion of the seat structure that allows the webbing 140 to exit the retractor 141 on a front surface 136 of the movable front frame 132. The webbing 140 is then allowed to cross over to the rear surface 137 of the front frame 132 as it rises to a turning-loop 138. This cross over by the seat belt webbing 140 from the front surface 136 to the rear surface 137 of the front frame 132 may be through a front frame web slot 139 cut to allow passage of the webbing without either impeding webbing 140 movement or front frame 132 integrity. This is accomplished by providing the front frame slot 139 in a rectangular shape larger than the cutaway cross-section of the webbing 140. The retractor 141 may be located forward of the seat back pivot point 133 on the seat frame 120 in order to allow for the webbing 140 to exit on the front surface 136 of the front frame seat back 132 as shown in FIG. 3. See FIGS. 2 and 3 for illustration of this paragraph. The location of the retractor 141 allows the foam 170 to be thinner at the knee impact zone 172.

As described above, the seat belt retractor and seat system of this invention and vehicle made with the seat system provide a number of advantages, some of which have been described above and others of which are inherent in the invention. Also modifications may be proposed to the seat belt retractor and seat system and vehicle made with the seat system of this invention without departing from the teachings herein.

We claim:

1. A passenger seat for a multi-passenger motor vehicle, the vehicle having a body with a seat mounting surface, comprising:

- a seat frame, mountable to the seat mounting surface;
- an immovable rear seat frame engaged to said seat frame, said rear seat frame providing an energy absorbing obstruction to protect a passenger of a vehicle rearward seat from moving out of his safety zone in a forward direction in the event of a vehicle rapid deceleration;
- a movable front frame, pivotably engaged to said seat frame forward of said immovable rear seat frame, said movable front frame providing a back resting surface for a passenger;
- said immovable rear frame being comprised of a rear frame seat structure, and an energy absorbing back pan with foam padding;
- a three point seat belt engaged to a seat belt retractor, said retractor being engaged to said seat frame, said seat belt causing a pivoting force upon said movable front frame during an activation event;
- said seat belt retractor being attached to a portion of said seat frame allowing webbing of said seat belt to exit said retractor onto a front surface of said movable front frame;
- said seat belt webbing crossing over to a rear surface of said front frame through a front frame web slot passing through said front frame;
- said seat belt running over a turning-loop engaged to said movable front frame; and
- said energy absorbing back pan having four sides, with three of said sides engaged to said rear frame seat structure, with a fourth lower horizontal side not attached to said rear frame seat structure.

2. The passenger seat for a multi-passenger motor vehicle of claim 1, wherein:

- said back pan having foam on a rearward side, said foam including an upper foam zone and a lower knee impact zone, said knee impact zone having a foam thickness less than said upper foam zone foam thickness.

3. The passenger seat for a multi-passenger motor vehicle of claim 2, wherein:

- said knee impact zone thickness being less than or equal to one third of said upper zone thickness.

4. A passenger seat for a multi-passenger motor vehicle, the vehicle having a body with a seat mounting surface, comprising:

- a seat frame, mountable to the seat mounting surface;
- an immovable rear seat frame engaged to said seat frame, said rear seat frame providing an energy absorbing obstruction to protect a passenger of a vehicle rearward seat from moving out his safety zone in a forward direction in the event of a vehicle rapid deceleration;
- a movable front frame, pivotably engaged to said seat frame forward of said immovable rear seat frame, said movable front frame providing a back resting surface for a passenger;

said immovable rear frame being comprised of a rear frame seat structure, and an energy absorbing back pan with foam padding;

a three point seat belt engaged to a seat belt retractor, said retractor being engaged to said seat frame, said seat belt causing a pivoting force upon said movable front frame during an activation event;

said seat belt retractor being attached to a portion of said seat frame forward of a pivot point of said movable front frame allowing webbing of said seat belt to exit said retractor onto a front surface of said movable front frame;

said seat belt webbing crossing over to a rear surface of said front frame through a front frame web slot passing through said front frame;

said seat belt running over a turning-loop engaged to said movable front frame;

said energy absorbing back pan having four sides, with three of said sides engaged to said rear frame seat structure, with a fourth lower horizontal side not attached to said rear frame seat structure; and said back pan having foam on a rearward side, said foam including an upper foam zone and a lower knee impact zone, said knee impact zone having a foam thickness less than said upper foam zone foam thickness.

5. The passenger seat for a multi-passenger motor vehicle of claim 4, wherein:

said knee impact zone thickness being less than or equal to one third of said upper zone thickness.

6. A multi-passenger motor vehicle, comprising:

a body with a seat mounting surface;

at least two passenger seats, one said passenger seat having seat frame, mounted to said seat mounting surface;

an immovable rear seat frame engaged to said seat frame, said rear seat frame providing an energy absorbing obstruction to protect a passenger of a vehicle rearward seat from moving out his safety zone in a forward direction in the event of a vehicle rapid deceleration;

a movable front frame, pivotably engaged to said seat frame forward of said immovable rear seat frame, said movable front frame providing a back resting surface for a passenger;

said immovable rear frame being comprised of a rear frame seat structure, and an energy absorbing back pan with foam padding as said energy absorbing obstruction;

a three point seat belt engaged to a seat belt retractor, said retractor being engaged to said seat frame, said seat belt causing a pivoting force upon said movable front frame during an activation event;

said seat belt retractor being attached to a portion of said seat frame forward of a pivot point of said movable front frame allowing webbing of said seat belt to exit said retractor onto a front surface of said movable front frame;

said seat belt webbing crossing over to a rear surface of said front frame through a front frame web slot passing through said front frame;

said seat belt running over a turning-loop engaged to said movable front frame; and said energy absorbing back pan having four sides, with three of said sides engaged to said rear frame seat structure, with a fourth lower horizontal side not attached to said rear frame seat structure.

7. The multi-passenger motor vehicle of claim 6, wherein:

said back pan having foam on a rearward side, said foam including an upper foam zone and a lower knee impact zone, said knee impact zone having a foam thickness less than said upper foam zone foam thickness.

8. The multi-passenger motor vehicle of claim 7, wherein:

said knee impact zone thickness being less than or equal to one third of said upper zone thickness.

* * * * *